J. S. SMITH.
SCHOLAR'S COMPANION.

No. 180,801. Patented Aug. 8, 1876.

Witnesses:
Theodore Foster.
R. S. Clark

Inventor:
James S. Smith
By Fitch Fitch
Attys.

UNITED STATES PATENT OFFICE.

JAMES S. SMITH, OF MIDDLETOWN, CONNECTICUT.

IMPROVEMENT IN SCHOLARS' COMPANIONS.

Specification forming part of Letters Patent No. 180,801, dated August 8, 1876; application filed May 4, 1876.

*To all whom it may concern:*

Be it known that I, JAMES S. SMITH, of Middletown, in the county of Middlesex and State of Connecticut, have invented an Improved School-Implement, of which the following is a full, clear, and exact description, reference being had to the accompanying drawings, forming part of this specification.

My invention consists in a hollow cylinder or tube, divided laterally into a greater and a lesser chamber, the end opening into the greater chamber being closed by a flanged stopper formed of or carrying an india-rubber eraser, and the end opening into the lesser chamber being closed by a flanged stopper carrying a sponge or similar substance, the said stoppers being provided with handles formed with eyes at their extremity, whereby a school-implement is constituted, which is adapted for use as a ruler, and furnishes a receptacle for carrying pens, pencils, &c., and also provides for convenient use a pencil-eraser, and a slate or blackboard cleaner or pen-wiper, as hereinafter particularly set forth and described.

Figure 1:
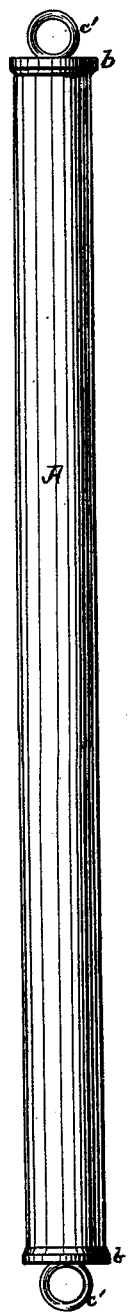
Figure 2:
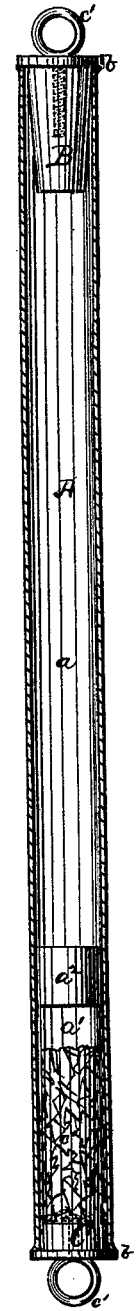

Figure 1 is an elevation of my improved school-implement, and Fig. 2 is a longitudinal central sectional view of the same.

A is a hollow cylinder or tube, which is preferably made of metal, and suitably coated with a varnish or lacquer, and polished so as to give an even and smooth surface throughout. This cylinder or tube is open at its ends, and is divided into a greater chamber, $a$, and a lesser chamber, $a^1$, by means of a partition, $a^2$. This partition is preferably made of some elastic or soft yielding substance, such as india-rubber or cork, which is introduced into one end of the tube, and forced through the same into its desired position, as shown. The end of the tube opening into the chamber $a$ is closed by a stopper, B, which is formed of or carries an india-rubber pencil-eraser, as shown. The end of the tube opening into the chamber $a^1$ is closed by a stopper, C, which carries, preferably attached to it by a metal clip, a sponge or other similar material, as shown at $c$. Each of these stoppers is headed by a flange, $b$, which, when the stoppers are introduced into the tube, project beyond the line of the wall of the tube somewhat, as shown, while they act as caps to the ends of the tube. Each stopper is also provided with a handle made in the form of an eye, as shown at $c'$. These handles may be used to screw or otherwise fasten the eraser and sponge, respectively, to their stoppers and caps, or they may be made part of the caps, and formed in the same piece with them.

Now, it is evident that an implement is thus constituted adapted to the convenient use of scholars; that pens, pencils, &c., may be placed and carried in the chamber $a$, and the points of such pens and pencils will be protected from injury by the elastic or yielding partition $a^2$ and the rubber stopper B; that the rubber stopper B will furnish a convenient pencil-eraser; that the sponge $c$ will constitute a pen-wiper, or slate or blackboard cleaner, while, being confined in the chamber $a^1$, it will be prevented from soiling, or otherwise injuring by contact, the articles contained in the chamber $a$; that the tube A will form a convenient ruler, the flanges $b$ upon the stoppers raising the tube off from the paper or other surface, so that it will be kept from contact with the fresh-ruled lines, and blotting avoided; and that the eye-handles $c'$ will serve to suspend the implement to a convenient hook or nail, when not in use.

I do not intend to claim, broadly, herein a hollow tube, having caps upon its ends, adapted for use as a pen or pencil case, as I am aware that such a device is not new. I intend to claim hereunder only the combination of the specific parts shown, arranged as described, and adapted to act or be used for the purposes set forth.

What I claim as my invention, and desire to secure by Letters Patent, is—

A school-implement composed of the tube A, divided laterally, by the elastic partition $a^2$, into the greater chamber $a$ and the lesser chamber $a^1$, the eraser-stopper B, closing the chamber $a$, and stopper C, carrying sponge $c$, closing chamber $a^1$, the said stoppers having flange-caps $b$, and eye-handles $c'$, as described.

JAMES S. SMITH.

Witnesses:
D. WARD NORTHROP,
A. B. CALEF.